(12) United States Patent
Goslin et al.

(10) Patent No.: US 11,457,281 B2
(45) Date of Patent: Sep. 27, 2022

(54) TECHNIQUES FOR GENERATING CONTEXTUALLY-RELEVANT RECOMMENDATIONS

(71) Applicant: DISNEY ENTERPRISES, INC., Burbank, CA (US)

(72) Inventors: Michael P. Goslin, Sherman Oaks, CA (US); Erika Varis Doggett, Los Angeles, CA (US); Anthony M. Accardo, Los Angeles, CA (US); Noel Brandon Vasquez, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/779,520

(22) Filed: Jan. 31, 2020

(65) Prior Publication Data
US 2021/0243498 A1 Aug. 5, 2021

(51) Int. Cl.
*G06F 16/2455* (2019.01)
*H04N 21/466* (2011.01)
(Continued)

(52) U.S. Cl.
CPC ......... *H04N 21/4668* (2013.01); *G06F 9/453* (2018.02); *G06F 16/2379* (2019.01);
(Continued)

(58) Field of Classification Search
CPC .. F25D 2700/02; F25D 2700/06; F25D 29/00; G06K 2209/17; G06T 2207/10048; G06T 2207/30128; G06T 7/0002; G06T 7/13; H04N 5/332; G06F 16/951; G06F 3/167; G06F 40/134; G06F 40/169;
(Continued)

(56) References Cited

U.S. PATENT DOCUMENTS 10,026,401 B1 * 7/2018 Mutagi .................. G06F 3/167
10,102,855 B1 * 10/2018 Sindhwani ............ G06F 40/169
(Continued)

OTHER PUBLICATIONS

Cano, et al.; Hybrid Recommender Systems: A Systematic Literature Review; dated Jan. 12, 2019; 38 pages.

*Primary Examiner* — Rong Le
(74) *Attorney, Agent, or Firm* — Artegis Law Group, LLP

(57) ABSTRACT

A recommendation engine generates contextually relevant media programs tailored to the specific context of the user. The recommendation engine interfaces with one or more Internet-of-Things (IoT) appliances to determine one or more food items stored within the IoT appliance(s) and/or one or more cooking capabilities associated with the IoT appliance(s). The recommendation engine also gathers profile data that reflects a set of preferences associated with the user. Based on the gathered data, the recommendation engine queries a database of cooking program data associated with various cooking programs. The recommendation engine obtains cooking program data that is contextually relevant to the user and then generates a contextual cooking program that describes how to perform a given recipe. During playback of the contextual cooking program, the recommendation engine can modify the contextual cooking program based on the progress of the user in following the recipe.

20 Claims, 6 Drawing Sheets

(51) Int. Cl.
*G06F 16/23* (2019.01)
*G06Q 10/08* (2012.01)
*H04N 21/436* (2011.01)
*H04N 21/472* (2011.01)
*H04N 21/41* (2011.01)
*G09B 19/00* (2006.01)
*G06F 9/451* (2018.01)

(52) U.S. Cl.
CPC ....... *G06F 16/2455* (2019.01); *G06Q 10/087* (2013.01); *G09B 19/003* (2013.01); *H04N 21/4131* (2013.01); *H04N 21/43615* (2013.01); *H04N 21/47217* (2013.01); *G09B 19/0092* (2013.01)

(58) Field of Classification Search
CPC ................ G06F 40/279; G06Q 10/087; G06Q 30/0635; G10L 15/22; G10L 2015/223
See application file for complete search history.

(56) References Cited

U.S. PATENT DOCUMENTS

| | | | |
|---|---|---|---|
| 10,281,200 B2 | 5/2019 | Johnston | |
| 10,853,761 B1* | 12/2020 | Bentley | ................ G06Q 10/087 |
| 2015/0237389 A1* | 8/2015 | Grout | ............... H04N 21/26283 |
| | | | 725/49 |
| 2016/0337702 A1* | 11/2016 | Klappert | ............ H04N 21/4826 |
| 2017/0083963 A1* | 3/2017 | Agarwal | ............... G06F 16/951 |

* cited by examiner

TECHNIQUES FOR GENERATING CONTEXTUALLY-RELEVANT RECOMMENDATIONS

BACKGROUND

Field of the Various Embodiments

The various embodiments relate generally to computer science and recommendation engines and, more specifically, to techniques for generating contextually-relevant recommendations.

Description of the Related Art

A recommendation engine is a type of software program that recommends items to users. Recommendation engines are commonly implemented in consumer-facing websites in order to assist users with finding items that are relevant to those users. For example, a recommendation engine associated with an online shoe retailer could recommend specific types of shoes to different users. Among other things, recommendation engines can reduce the extent to which users have to manually search for relevant items and, therefore, can increase user engagement with various types of consumer-facing websites, including product-oriented websites, service-oriented websites, and media-oriented websites, to name a few.

A recommendation engine associated with a consumer-facing website can implement several techniques for recommending items to a user. Using one technique, the recommendation engine analyzes the browsing history of the user and then recommends items that are similar to the items the user has previously viewed. For example, the recommendation engine could determine that the user previously viewed different gardening tools and could then recommend one or more additional gardening tools to the user. Using another technique, the recommendation engine analyzes the browsing behavior of the user relative to one or more items and then recommends items based on user engagement with those items. For example, the recommendation engine could determine that the user typically does not purchase items that cost more than one hundred dollars and then subsequently recommend items that cost less than one hundred dollars to the user. As a general matter, recommendation engines associated with consumer-facing websites typically recommend items to users based on historical information associated with those users or similar users.

One problem with conventional recommendation engines is that, because the recommendations provided to users are generated based on historical information, those recommendations can be out-of-date and not reflect the current state or context of the user. For example, a conventional recommendation engine could recommend that the user purchase a certain item, even though the user recently purchased that item and therefore no longer needs the item. Alternatively, a conventional recommendation engine could recommend that the user watch a particular cooking show where the user is instructed how to prepare a certain dish, even though the user does not have the necessary ingredients, utensils, appliances, and/or cooking skills to prepare that dish. Recommendations that are irrelevant to the user do not engage the user and, consequently, can reduce user engagement with consumer-facing websites where recommendation engines are used.

Another problem with conventional recommendation engines is that, because the recommendations provided to users are generated based on historical information, those recommendations can become irrelevant when the state or context of the user changes. For example, suppose a conventional recommendation engine recommends that the user watch an instructional video demonstrating how a sequence of steps should be performed. If the user cannot perform certain steps as quickly as described in the instructional video, then the instructional video could end up advancing to subsequent steps that are not yet relevant to the user. These types of situations also can reduce user engagement with consumer-facing websites where recommendation engines are used.

As the foregoing illustrates, what is needed in the art is a more effective technique for generating contextually-relevant recommendations to users.

SUMMARY

Various embodiments include a computer-implemented method for generating a media program, including determining a first state that is associated with a first appliance or at least one item stored within the first appliance, determining a first portion of media content based on the first state, wherein the first portion of media content includes a first instruction associated with the first state, and generating a first media program based on the first portion of media content, wherein the first media program provides instructions to a user for performing one or more operations associated with the first state.

At least one technical advantage of the disclosed techniques relative to the prior art is that the disclosed techniques enable contextually relevant media to be automatically generated for users. In the example of an instructional cooking program, a program generated using the disclosed techniques may be more engaging to users than cooking programs recommended to users via conventional recommendation engines.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
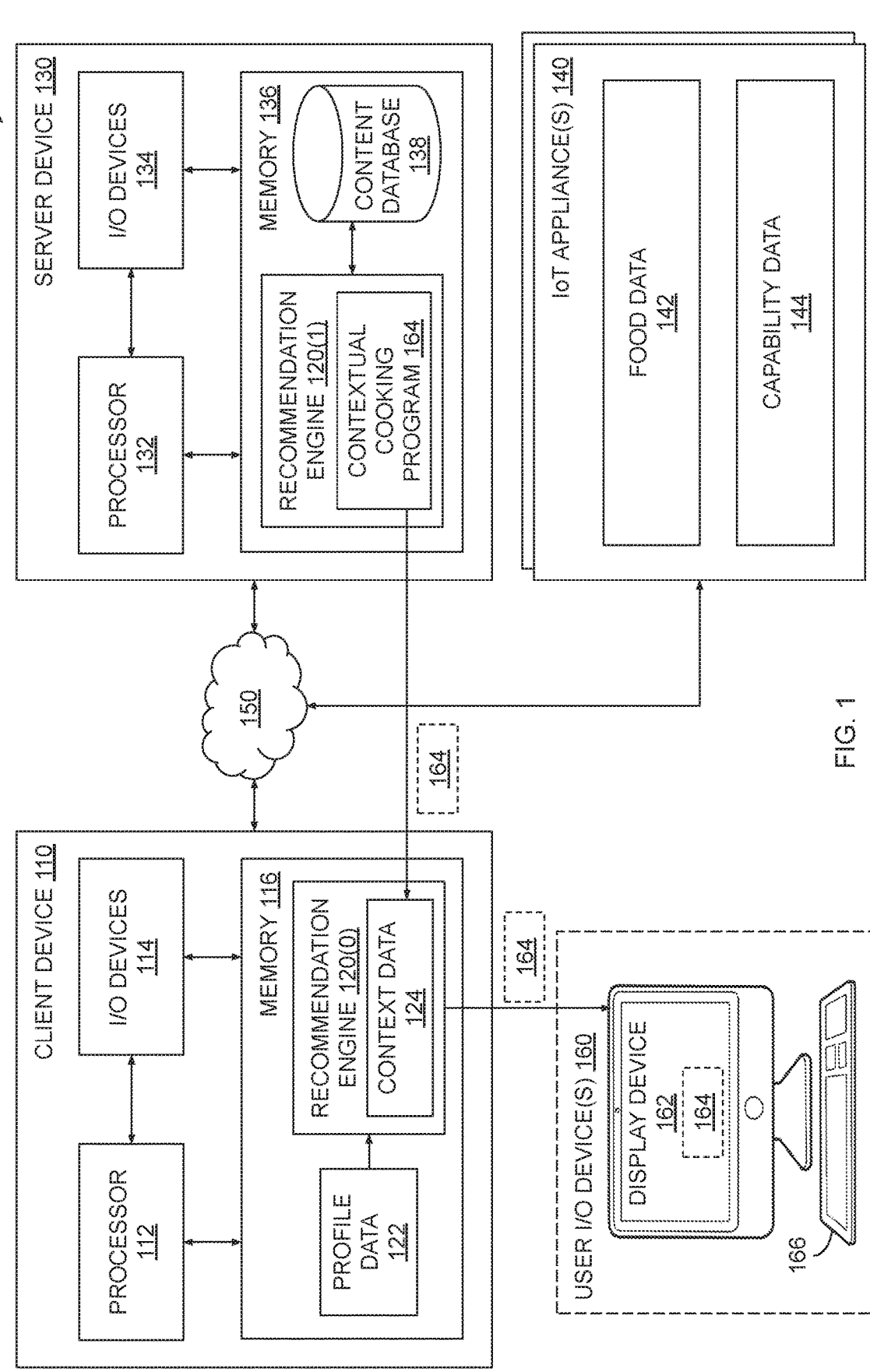
FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, recommendation engines can be implemented to improve usability of various types of consumer-facing websites, including product-oriented websites, service-oriented websites, and media-oriented websites. One problem with conventional recommendation engines is that because the recommendations provided to users are generated based on historical information, those recommendations are often out of date and therefore do not reflect the current state or context of the user. Another problem with conventional recommendation engines is that because the recommendations provided to users are generated based on historical information, those recommendations can become irrelevant when the state or context of the user changes. Recommendations that are irrelevant to the user do not engage the user with consumer-facing websites where recommendation engines are used, and in some cases, can reduce user engagement with such websites.

To address these issues, various embodiments include a recommendation engine that generates contextually relevant recommendations of media programs for a user and/or generates customized media programs tailored to the specific context of the user. The recommendation engine interfaces with one or more Internet-of-Things (IoT) appliances to gather appliance data that indicates one or more food items stored within the IoT appliance(s) and/or one or more cooking capabilities associated with the IoT appliance(s), among other information. The recommendation engine also gathers profile data that reflects a set of preferences associated with the user, one or more food items recently purchased by the user, and/or dietary constraints associated with the user, among other information. The recommendation engine processes the appliance data and the profile data to generate context data indicating the overall state and/or context of the user.

Based on the context data, the recommendation engine queries a database that stores cooking program data associated with various cooking programs. The cooking program data associated with a given cooking program includes media content associated with the cooking program, such as audio/visual data related to a person or virtual entity performing a procedure for preparing one or more food items. The cooking program data also includes a recipe that indicates step-by-step instructions corresponding to that procedure as well as data indicating one or more ingredients, utensils, and/or appliances needed to implement the recipe. In one embodiment, the recommendation engine generates cooking program data by analyzing one or more pre-existing cooking programs.

In response to querying the database, the recommendation engine obtains cooking program data that is contextually relevant to the user. Such contextually-relevant cooking program data may correspond to recipes for which the user is currently in possession of the needed ingredients, utensils, and/or appliances. Contextually-relevant cooking program data may also correspond to recipes in which the user has expressed an interest in following or recipes for which the user has the needed skill level to successfully perform.

Based on the cooking program data, the recommendation engine generates a contextual cooking program that includes media content describing how to perform the associated recipe. During playback of the contextual cooking program, the recommendation engine monitors the progress of the user in following the recipe and can modify the contextual cooking program, or playback thereof, in order to maintain synchrony with and/or adapt to the progress of the user. The recommendation engine also updates the profile data associated with the user based on the progress of the user in following the recipe, one or more food preparation skills learned in following the recipe, and other data generated while the user follows the recipe set forth in the contextual cooking program.

In one embodiment, the user may initially interact with the recommendation engine to specify various criteria for consideration when recommending and/or generating a recipe or cooking program. Such criteria could include, for example, reducing waste, prioritizing ingredients that are locally-sourced, in season, and/or close to expiration, targeting a specific range of preparation times, or adhering to a specific meal plan and/or recommended calorie/nutritional intake, among others. Then, the recommendation engine may combine the above criteria with any additional metadata associated with the user, such as a skill level, a flavor profile, and so forth, and generate and/or recommend a set of cooking programs that are suited for the user at a current point in time. In this manner, the recommendation engine can generate or recommend contextual cooking programs and corresponding recipes based on a wide variety of relevant data.

At least one technical advantage of the disclosed techniques relative to the prior art is that the disclosed techniques enable contextually relevant cooking programs to be automatically generated for users. Accordingly, cooking programs generated using the disclosed techniques may be more engaging to users than cooking programs recommended to users via conventional recommendation engines. Another technical advantage of the disclosed techniques is that the disclosed techniques enable a cooking program to be dynamically adapted to the progress of the user in following a recipe set forth in the cooking program. By adapting the cooking program to each particular user, user engagement is maintained or enhanced throughout the course of the cooking program. Yet another technical advantage of the disclosed techniques is that the disclosed techniques enable a cooking program to be optimized to fit a predefined set of criteria, such as reduction of waste, environmental impact, nutritional intake, dietary needs, allergy considerations, flavor profile, preparation time, skill level, and/or cost, so as to better fit the particular needs of a given user. These techniques are broadly applicable to any technically feasible type of media beyond cooking programs, although cooking programs are described herein for exemplary purposes. These technical advantages represent one or more technological advancements over prior art approaches.

System Overview

FIG. 1 illustrates a system configured to implement one or more aspects of the various embodiments. As shown, a system 100 includes a client device 110, a server device 130, and one or more Internet-of-Things (IoT) appliances 140 coupled together via a network 150. Client device 110 is also coupled to one or more user input/output (I/O) devices 160, which includes a display device 162 and various input devices 166. Display device 162 and input devices 166 can be separate (e.g. a monitor and a keyboard/mouse) or integrated with one another (e.g. a touch screen tablet).

Client device 110 or server device 130 may be any technically feasible type of computer system, including a desktop computer, a laptop computer, a mobile device, a virtualized instance of a computing device, a distributed and/or cloud-based computer system, and so forth. IoT appliance(s) 140 may include any technically feasible type of household appliance that is configured to communicate with client device 110 and/or server device 130 via network 150, including a smart refrigerator, a smart microwave, a smart range (electric or gas stove), a smart oven, and so forth. Network 150 may be any technically feasible set of interconnected communication links, including a local area network (LAN), wide area network (WAN), the World Wide Web, the Internet, or any combination thereof. In one embodiment, client device 110 and server device 130 may be coupled together via the Internet, and client device 110 and IoT appliance(s) 140 may be coupled together via a local network, such as a WiFi network or Bluetooth.

As further shown, client device 110 includes a processor 112, I/O devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a universal serial bus (USB) port, a high-definition multimedia interface (HDMI) port, or a serial interface, among others. Memory 116 includes any technically feasible storage media configured to store data and software applications, such as, for example, a hard disk, a random-access memory (RAM) module, and a read-only memory (ROM). Memory 116 includes a recommendation engine 120(0), profile data 122 associated with a user, and context data 124. Recommendation engine 120(0) is configured to generate context data 124 based, at least in part, on profile data 122, as described in greater detail below. In so doing, recommendation engine 120(0) interoperates with a recommendation engine 120(1) that resides on server device 130.

Server device 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as various types of data ports. Memory 136 includes any technically feasible storage media configured to store data and software applications, such as, for example, a hard disk, a RAM module, and a ROM. Memory 136 includes recommendation engine 120 (1) mentioned above as well as a content database 138.

In operation, recommendation engine 120(0) within client device 110 interfaces with IoT appliance(s) 140 in order to gather various types of appliance data, including food data 142 and capability data 144. For a given IoT appliance 140, food data 142 indicates the types of food items stored in the IoT appliance 140 or the types of food items that can be prepared using the IoT appliance 140. For example, if the IoT appliance 140 is a smart refrigerator, then food data 142 could indicate the different food items currently stored in the smart refrigerator, the amounts of food items currently available, the expiration dates and/or nutritional information associated with those food items, and so forth. Alternatively, if the IoT appliance 140 is a smart microwave, then food data 142 could indicate the types of food items that can be cooked/microwaved using the smart microwave. As a general matter, any given IoT appliance 140 can acquire information such as that described above using any existing techniques that IoT appliances use to acquire such information.

Capability data 144 indicates, for a given IoT appliance 140, the specific food preparation capabilities associated with that IoT appliance 140. For example, if the IoT appliance 140 is a smart stove, then capability data 144 could indicate that the smart stove is capable of frying, boiling, simmering, and other food-oriented operations that can be performed using a stove. Further, capability data 144 could indicate a temperature range available for various food preparation activities, a food preparation capacity of the IoT appliance 140, available utensils that can be used in conjunction with the IoT appliance 140, and any other technically feasible data that describes the operational capabilities of the IoT appliance 140.

Recommendation engine 120(0) also interacts with the user in order to gather and/or generate profile data 122. Profile data 122 indicates various preferences associated with the user, including food item preferences, food preparation preferences, appliance preferences, cooking program preferences, and so forth. Profile data 122 also indicates various constraints associated with the user, including dietary restrictions, food allergies, restrictions on cooking skill level, and so forth. Profile data 122 can also indicate a viewing history associated with the user relative to a video streaming service, a set of behaviors the user performs relative to the video streaming service, and so forth. Based on food data 142, capability data 144, and profile data 122, recommendation engine 120(0) generates context data 124 to represent the overarching context or state within which the user performs food preparation and cooking operations within a kitchen environment. Context data 124 may thus reflect the state of one or more IoT appliances 140 and/or any item stored therein.

Recommendation engine 120(0) then transmits context data 124 to recommendation engine 120(1).

Recommendation engine 120(1) queries content database 138 based on context data 124 to obtain data records associated with cooking programs that may be relevant to the user given the current context of the user, including media content associated with the preparation and/or cooking of food. In one embodiment, recommendation engine 120(1) may query content database 138 using a weighted combination of characteristics set forth in context data 124. The media content returned by content database 138 generally corresponds to recipes that call for ingredients the user currently has in possession, recipes that involve one or more IoT appliances 140, recipes that align with the preferences of the user without violating any constraints of the user, and any other recipes that can be associated with or derived from context data 124. The media content may include one or more media clips, one or more media programs, one or more recipes associated with those media clips and/or media programs, as well as data describing various ingredients, utensils, and appliances on which those recipes depend. In one embodiment, recommendation engine 120(1) populates context database 138 based on an analysis of pre-existing cooking programs, as described in greater detail below in conjunction with FIGS. 2-4. Based on any or all of the above described data, recommendation engine 120(1) generates a contextual cooking program 164 and transmits contextual cooking program 164 to recommendation engine 120(0).

Contextual cooking program 164 may include live action portions, virtual portions rendered for display, and/or interactive portions that involve user input. Recommendation engine 120(0) outputs contextual cooking program 164 to the user via display device 162. During playback of contextual cooking program 164, recommendation engine 120(0) monitors the progress of the user in following the recipe set forth in contextual cooking program 164. Recommendation engine 120(0) can then modify contextual cooking program 164, or playback thereof, in order to maintain synchrony between food preparation steps set forth in contextual cooking program 164 and food preparation steps being performed by the user, as described in greater detail below in conjunction with FIG. 5.

With the above techniques, recommendation engines 120(0) and 120(1) interoperate to generate cooking programs for users that are contextually relevant. Accordingly, those cooking programs may be more engaging to users than cooking programs suggested via conventional recommendation engines, thereby leading to greater user satisfaction.

Figure 2:
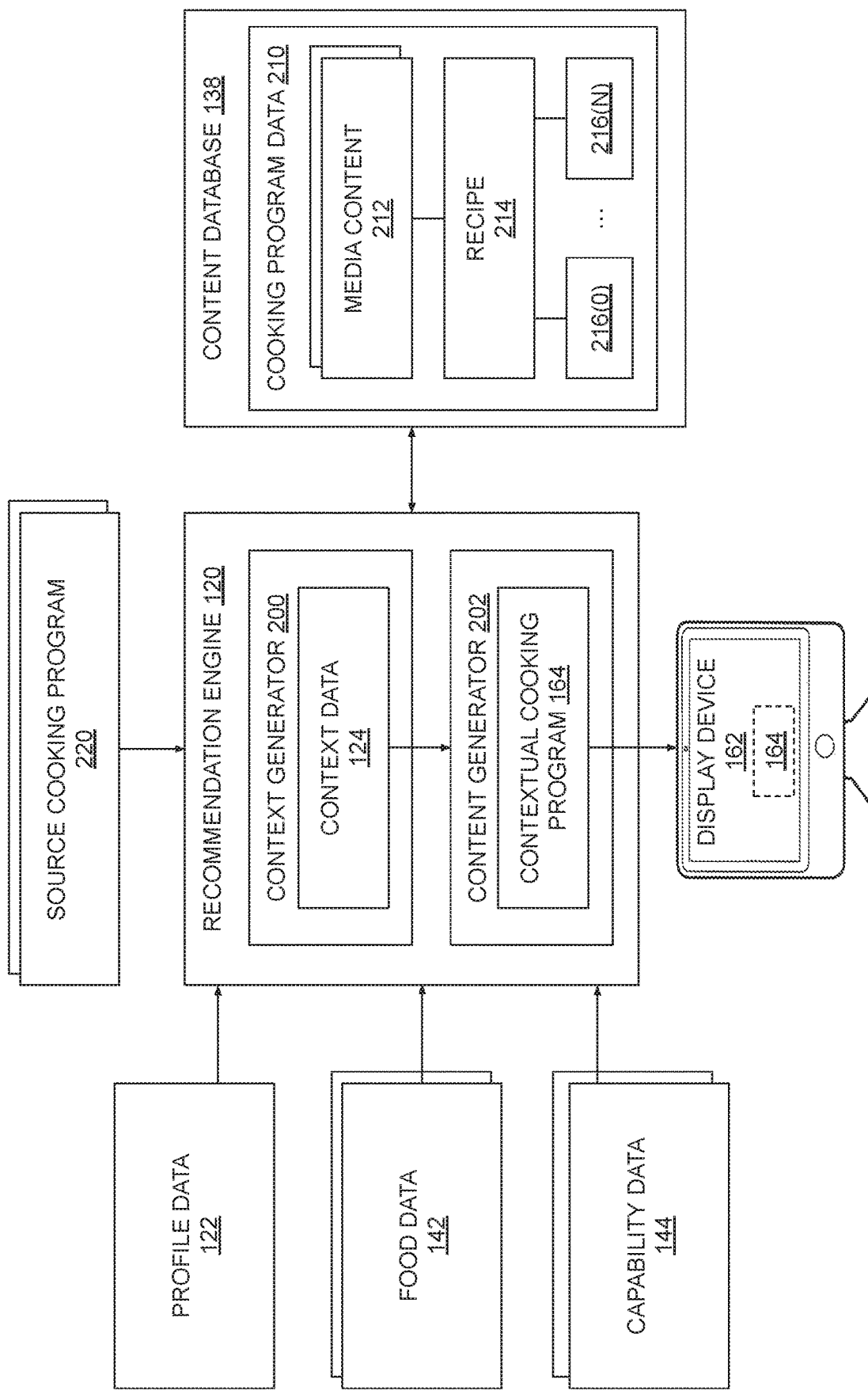
FIG. 2 is a more detailed illustration of the recommendation engine and content database of FIG. 1, according to various embodiments.

In various embodiments, recommendation engines 120(0) and 120(1) represent separate portions of a distributed software entity, collectively referred to herein as recommendation engine 120, as shown in FIG. 2, where the inventive operations described herein are distributed and/or balanced across client device 110 and sever device 130 in any technically feasible fashion. In these embodiments, the different portions of recommendation engine 120 may communicate with one another for the purposes of load balancing and/or work distribution, among other tasks, according to any existing technique(s). In other various embodiments, however, any or all of the inventive operations described herein can be performed by either recommendation engine 120(0) on client device 110 or recommendation engine 120(1) on server device 130. For example, in some embodiments, recommendation engine 120(1) can generate context data 124.

Software Overview

FIG. 2 is a more detailed illustration of the recommendation engine and content database of FIG. 1, according to various embodiments. As shown, recommendation engine 120 includes a context generator 200 and a content generator 202. As also shown, content database 138 includes cooking program data 210.

Context generator 200 is a software module that is configured to process profile data 122, food data 142, and capability data 144 to generate context data 124. As discussed above, context data 124 represents the overarching context or state within which the user performs food preparation and cooking operations. In one embodiment, context data 124 may include a set of tags that correspond to characteristics associated with the user and/or one or more IoT appliance(s) 140 or any items included therein, a vector of data values that quantify those characteristics, and/or a set of weight values indicating the relative importance of each characteristic. A given set of tags may be generated dynamically by context generator 200 or assigned by another entity. Context generator 200 provides context data 124 to content generator 202.

Content generator 202 is a software module that is configured to query content database 138 based on context data 124 to identify cooking program data 210 that may be relevant to the user. In embodiments where context data 124 includes a set of tags corresponding to characteristics of the user and/or IoT appliances 140, content generator 202 may query content database 138 to identify cooking program data 210 that is associated with the set of tags. Such tags can be generated or assigned during generation of cooking program data 210. Content generator 202 may then rank different sets of cooking program data 210 based on the degree to which each set of cooking program data 210 corresponds to the set of tags.

As is shown, cooking program data 210 includes media content 212, one or more recipes 214, and one or more dependencies 216(0) through 216(N) (hereinafter "dependencies 216"). Media content 212 includes audiovisual data corresponding to a person or virtual entity performing food preparation and/or cooking operations, while recipe 214 delineates those food preparation and/or cooking operations. Dependencies 216 indicate various ingredients, utensils, and/or appliances on which recipe 214 depends. Dependencies 216 may also indicate various food preparation and/or cooking skills that are needed to successfully follow recipe 214 as well as potential sources of information for developing those skills, such as video tutorials. Each dependency 216 may be associated with metadata indicating a priority level associated with the dependency, an alternative version of that dependency, or one or more sources via which the dependency can be obtained. For example, a dependency 216 corresponding to a particular ingredient could include metadata indicating that the ingredient is optional or required, metadata indicating a different ingredient that can be substituted in the recipe, and/or a location where the ingredient can be obtained.

In one embodiment, content generator 202 identifies relevant cooking program data 210 based on context data 124 by comparing context data 124 to dependencies 216 and then extracting cooking program data 210 based on whether the corresponding dependencies 216 are met. For example, suppose context data 124 indicates a set of food items that the user currently has available. Content generator 202 would thus only retrieve program cooking data 210 associated with recipes that call for the use of those food items and do not call for the use of food items that the user does not currently have available. In another example, suppose context data 124 indicates that the user does not have access to a microwave. Content generator 202 would thus only retrieve cooking program data 210 associated with recipes that do not involve the use of a microwave.

In one embodiment, the metadata associated with a given dependency 216 may be used by recommendation engine 120 in order to automatically meet or resolve the given dependency 216 on behalf of the user, thereby allowing the user to follow the associated recipe. For example, recommendation engine 120 could determine that the user lacks a specific ingredient corresponding to a given dependency 216 associated with a particular recipe. Recommendation engine 120 could then automatically order that specific ingredient for delivery to the user directly or via interaction with one or more IoT appliances 140 configured to order items. In this manner, recommendation engine 120 resolves the given dependency 216 and provides the user with the needed ingredients to follow the recipe. In other embodiments, recommendation engine 120 may add the item to an electronic shopping list along with a link to where the item can be purchased for delivery.

Content generator 202 generates contextual cooking program 164 based on some or all of cooking program data 210. In some instances, content generator 202 simply obtains media content 212 and then streams that media content to the user. In more complex configurations, content generator 202 dynamically generates contextual cooking program 164 by splicing media content 212 with graphics rendered based on recipe 214 and/or dependencies 216. Content generator 202 outputs contextual cooking program 164 to the user via display device 162. During playback, content generator 202 can dynamically modify contextual cooking program 164, or playback thereof, based on the progress of the user in performing the various steps associated with the recipe or based on interactions with the user, as described in greater detail below in conjunction with FIG. 5. Content generator 202 can also splice additional interstitial content into contextual cooking program 164 during periods of time when the user is waiting. For example, while the user waits for a pot of water to boil, content generator 202 could insert an animated short or an advertisement into contextual cooking program 164.

In one embodiment, context generator 200 may implement a hybrid approach to generating contextually-relevant cooking programs independently or via interoperation with content generator 202. In particular, context generator 200 may implement knowledge-based filtering relative to food data 142 and capability data 144, collaborative filtering relative to viewing behavior and/or demographic data set forth in profile data 122, and content-based filtering based on a viewing history and/or associated content tags set forth in profile data 122. Context generator 200 then generates a vector of data values to quantify various characteristics determined through the above filtering operations. Based on the vector of data values, content generator 202 can then dynamically weight and/or augment each data value and query content database 138 to generate a set of recommendations of cooking program data 210 and/or associated media content 212.

Recommendation engine 120 can be configured to generate cooking program data 210 based on one or more source cooking programs 220 and/or different portions thereof, as described in greater detail below in conjunction with FIGS. 3-4.

Generating Cooking Program Data

Figure 3:
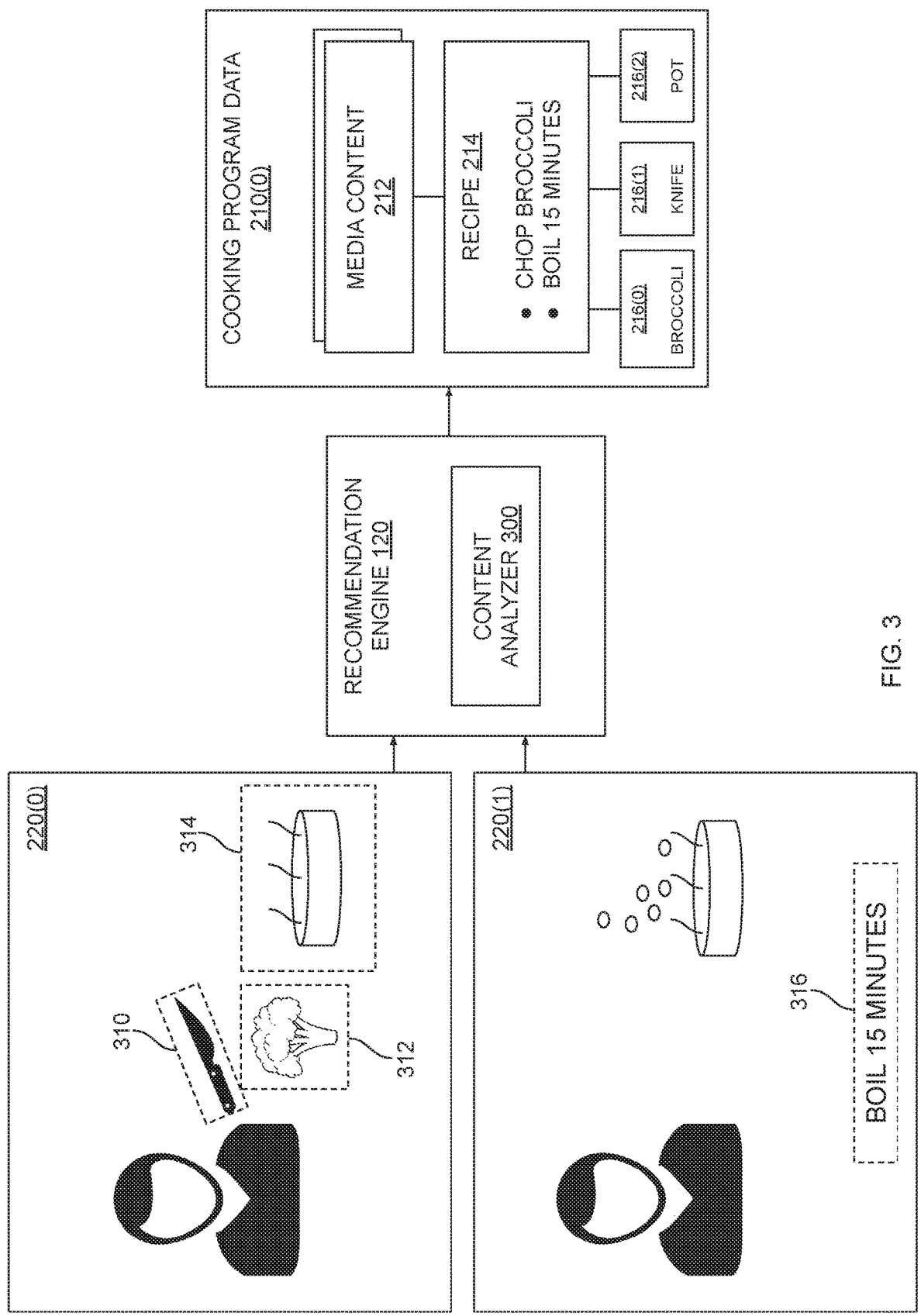
FIG. 3 illustrates how the recommendation engine of FIG. 1 generates cooking program data, according to various embodiments.

FIG. 3 illustrates how the recommendation engine of FIG. 1 generates cooking program data, according to various embodiments. As shown, recommendation engine 120 includes a content analyzer 300 that is configured to analyze different portions of a source cooking program 220 related to a recipe 214 in order to generate cooking program data 210(0). In the example shown, source cooking program portion 220(0) depicts a person using a knife 310 to chop a head of broccoli 312 while a pot of water 314 boils. Source cooking program portion 220(1) depicts the person adding chopped broccoli to pot, as well as message 316 indicating that the broccoli should boil for 15 minutes. Message 316 could be, for example, a closed captioning message or other graphic depicting text.

Content analyzer 300 is configured to implement machine learning, computer vision, speech recognition and/or natural language processing, neural networks, and any other technically feasible form of artificial intelligence in order to identify the various food preparation and/or cooking operations set forth in source cooking program 220 and then delineate those operations in recipe 214 as a set of instructions. As is shown, recipe 214 indicates two instructions, "chop broccoli" and "boil 15 minutes." In addition, content analyzer 300 implements any of the above techniques to identify various dependencies 216 associated with recipe 214, including dependency 216(0) indicating that broccoli is needed, dependency 216(1) indicating that a knife 216(1) is needed, and dependency 216(2) indicating that a pot is needed. Content analyzer 300 may also identify other dependencies associated with items not explicitly shown in FIG. 3, such as a stove or a water source, for example. Content analyzer 300 also parses source cooking program 220 to generate media content 212. For example, content analyzer 300 could divide source cooking program 220 into media clips that correspond to specific steps of recipe 214. Subsequently, content generator 202 could dynamically recombine those media clips in varying sequences to generate customized cooking programs that reflect the skill level of the user, the progress of the user, and so forth. The techniques described above are described in greater detail below in conjunction with FIG. 4.

Figure 4:
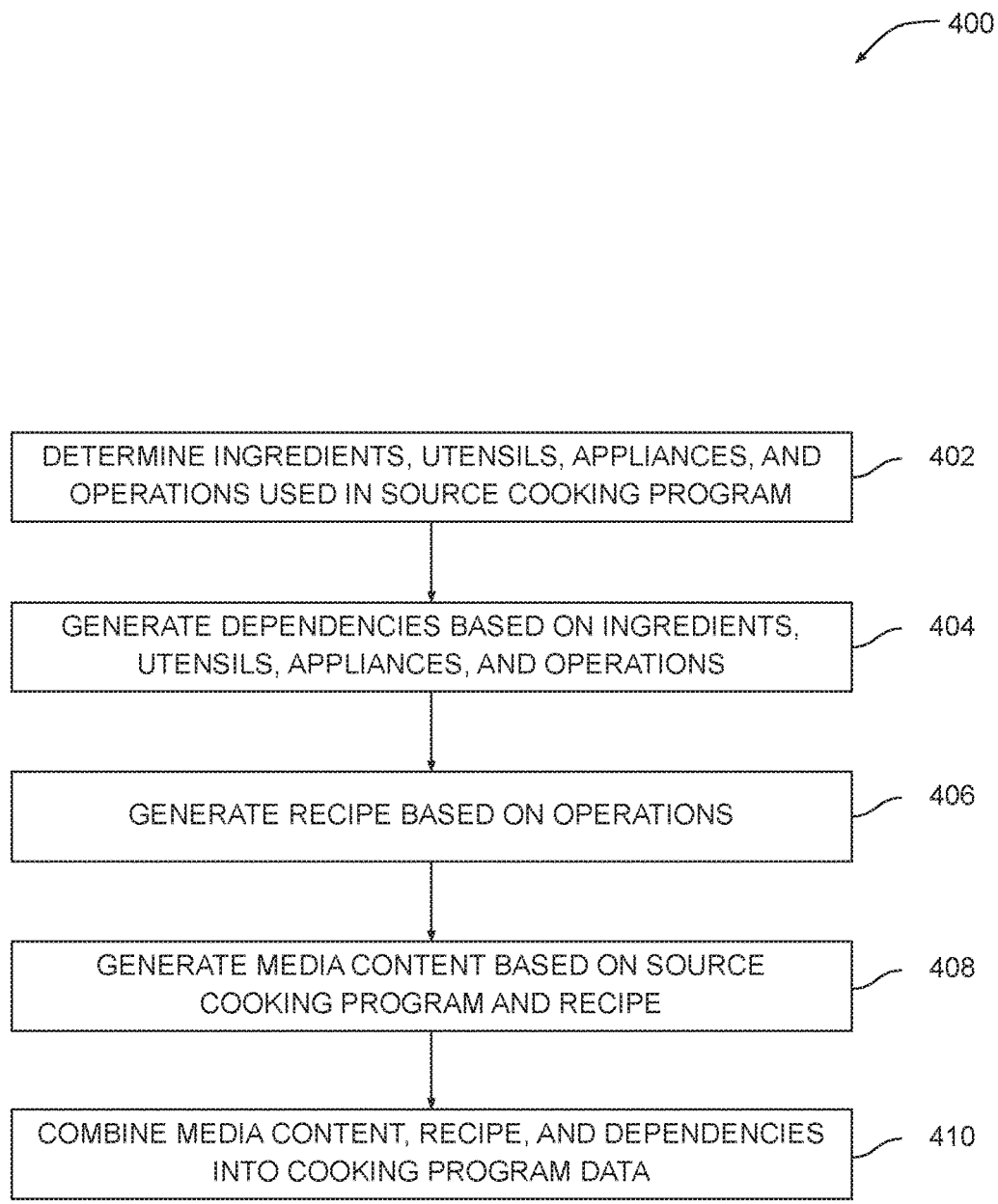
FIG. 4 is a flow diagram of method steps for generating cooking program data, according to various embodiments.

FIG. 4 is a flow diagram of method steps for generating cooking program data, according to various embodiments. Although the method steps are described in conjunction with the systems of FIGS. 1-3, persons skilled in the art will understand that any system configured to perform the method steps in any order falls within the scope of the present embodiments.

As shown, a method 400 begins at step 402, where content analyzer 300 within recommendation engine 120 determines one or more ingredients, utensils, appliances, or operations used in source cooking program 220. In various embodiments, one or more of the above referenced items may be omitted. For example, some recipes 214 may not explicitly call for any appliances. Recommendation 120 may further be configured to weight the relative importance of each dependency and indicate to the user which dependencies can be safely omitted. Content analyzer 300 can also identify specific skills that are needed to perform the identified operations, determine the amount of time needed to perform those operations, and/or determine quantities of ingredients needed when performing the operations. As a general matter, content analyzer 300 can implement any technically feasible approach to identifying features within audiovisual data when performing step 402, including machine learning, computer vision, natural language processing, and/or neural networks. FIG. 3 sets forth an example of how content analyzer 300 analyzes a source cooking program 220 in order to determine any of the above-described data.

At step 404, content analyzer 300 generates one or more dependencies 216 based on the ingredients, utensils, appliances, and operations determined at step 402. A given dependency 216 generally relates to something that is needed to perform the various operations set forth in source cooking program 220, including a specific amount of a given ingredient, a utensil needed to perform those operations, and/or an appliance used in performing the operations. A given dependency 216 may also relate to a cooking skill that is needed, an amount of time that is needed, and any other data associated with cooking operations.

At step 406, content analyzer 300 generates a recipe 214 based on the operations determined at step 402. Recipe 214 indicates a set of instructions corresponding to the operations performed in source cooking program 220. Content analyzer 300 can generate the set of instructions by parsing text directly from source cooking program 220 or using artificial intelligence to identify specific operations performed in source cooking program 220 and then generating instructions that describe those operations. In various embodiments, content analyzer 300 may import a recipe that meets a set of criteria corresponding to the various data determined via steps 402 and 404 (i.e. without explicitly generating any recipes) and may then recommend that recipe at step 406.

At step 408, content analyzer 300 generates media content 212 based on source cooking program 220 and recipe 214. In doing so, content analyzer 300 parses different portions of source cooking program 220 that correspond to each instruction set forth in recipe 214. Each portion of source cooking program 220 depicts a person or virtual entity performing a food preparation and/or cooking operation associated with a given instruction. In various embodiments, content analyzer may generate media content to graphically depict instructions set forth in recipe 214.

At step 410, content analyzer 300 combines the dependencies 216, recipe 214, and media content 212 generated at steps 404, 406, and 408, respectively, into cooking program data 210. Content analyzer 300 can then populate content database 138 with data records that include cooking program data 210. Subsequently, content generator 202 can query content database 138 for cooking program data 210 that is relevant to the user and dynamically generate contextual cooking program 164 based on identified cooking program data 210, as described in greater detail below in conjunction with FIGS. 5-6.

Generating a Contextual Cooking Program

Figure 5:
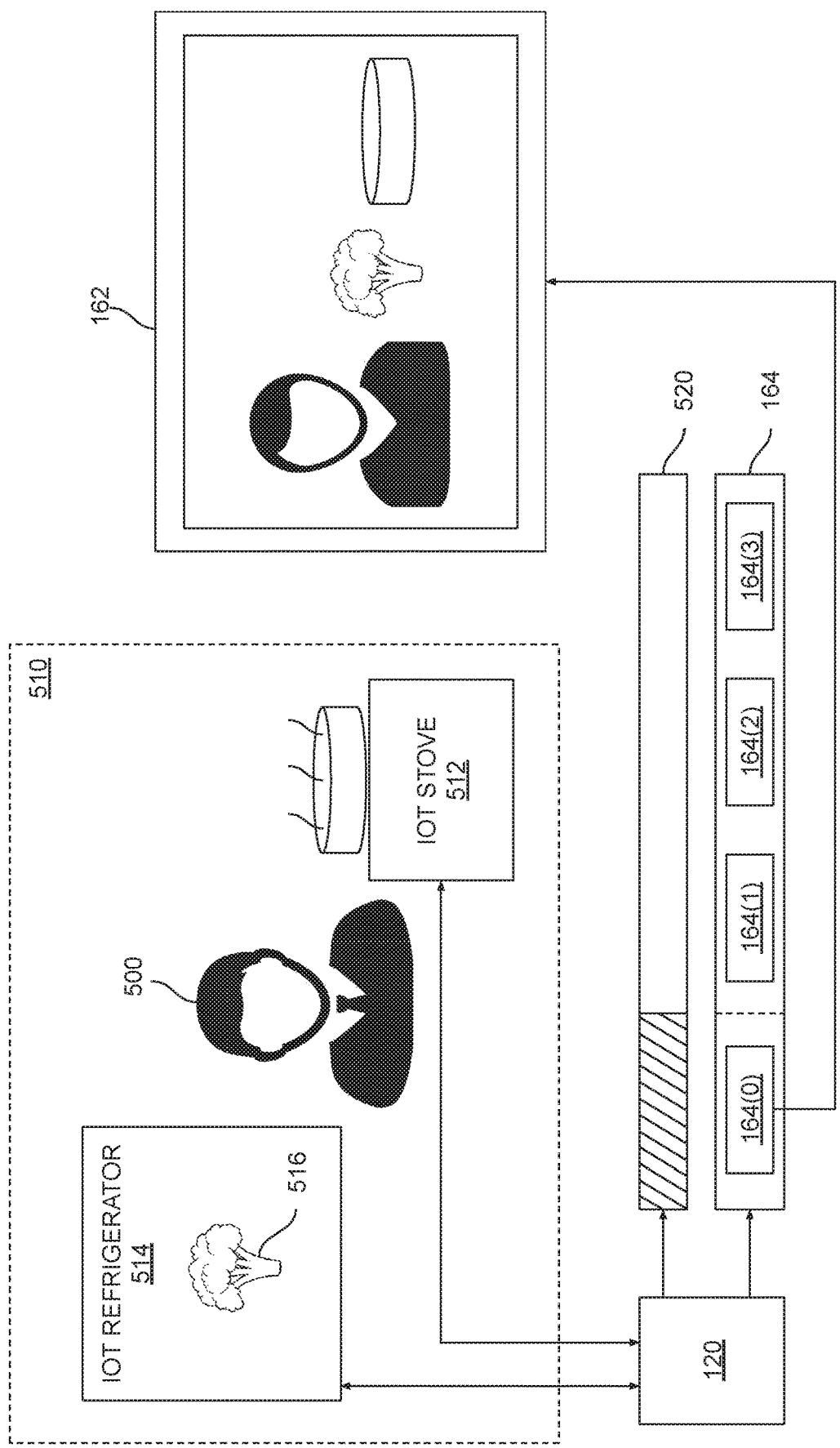
FIG. 5 illustrates how the recommendation engine of FIG. 1 generates a contextual cooking program, according to various embodiments.

FIG. 5 illustrates how the recommendation engine of FIG. 1 generates a contextual cooking program, according to various embodiments. As shown, a user 500 resides within a kitchen area 510 that includes an IoT stove 512 and an IoT refrigerator 514. IoT refrigerator 514 stores food item 516, which is a head of broccoli in this example. In one embodiment, kitchen area 510 is a smart kitchen that includes various input and output devices in order to both monitor the actions of user 500 and output various information to user 500.

In exemplary operation, recommendation engine 120 interfaces with IoT stove 512 and IoT refrigerator 516 in order to determine the state of those IoT appliances, including the food preparation capabilities of IoT stove 512 and the specific food items stored within IoT refrigerator 514. Recommendation engine 120 then queries content database 138 in the manner described previously in order to determine cooking program data 210 that may be relevant to user 500. Such cooking program data could include, for example, a recipe 214 for preparing broccoli using a stove.

Recommendation engine 120 then generates contextual cooking program 164 based on media content 212 included in the identified cooking program data 210. Recommendation engine 120 can divide contextual cooking program 164 into segments 164(0) through 164(3) that correspond to different operations that user 500 is supposed to perform when following recipe 214 set forth in contextual cooking program 164. Recommendation engine 120 can then incrementally output each segment based on the progress of user 500 in following recipe 214. In doing so, recommendation engine 120 generates progress data 520 to indicate a specific instruction associated with recipe 214 that user 500 is currently performing. Recommendation engine 120 can identify the specific instruction the user is currently performing based on interactions with IoT appliances 140, based on explicit user input, and/or using computer vision or other relevant techniques. Recommendation engine 120 then modifies playback of contextual cooking program 164 to maintain synchrony with the progress of user 500. In the example shown, recommendation engine 120 determines that user 500 is on the first step of recipe 214, and therefore outputs segment 164(0) of contextual cooking program 164 in order to instruct user 500 to obtain food item 516. Recommendation engine 120 can implement a similar technique in order to advance a playback position to a relevant segment based on the progress of user 500. In this manner, recommendation engine 120 implements a feedback loop in order to dynamically modify contextual cooking program 164, or playback thereof. These techniques are described in greater detail below in conjunction with FIG. 6.

Figure 6:
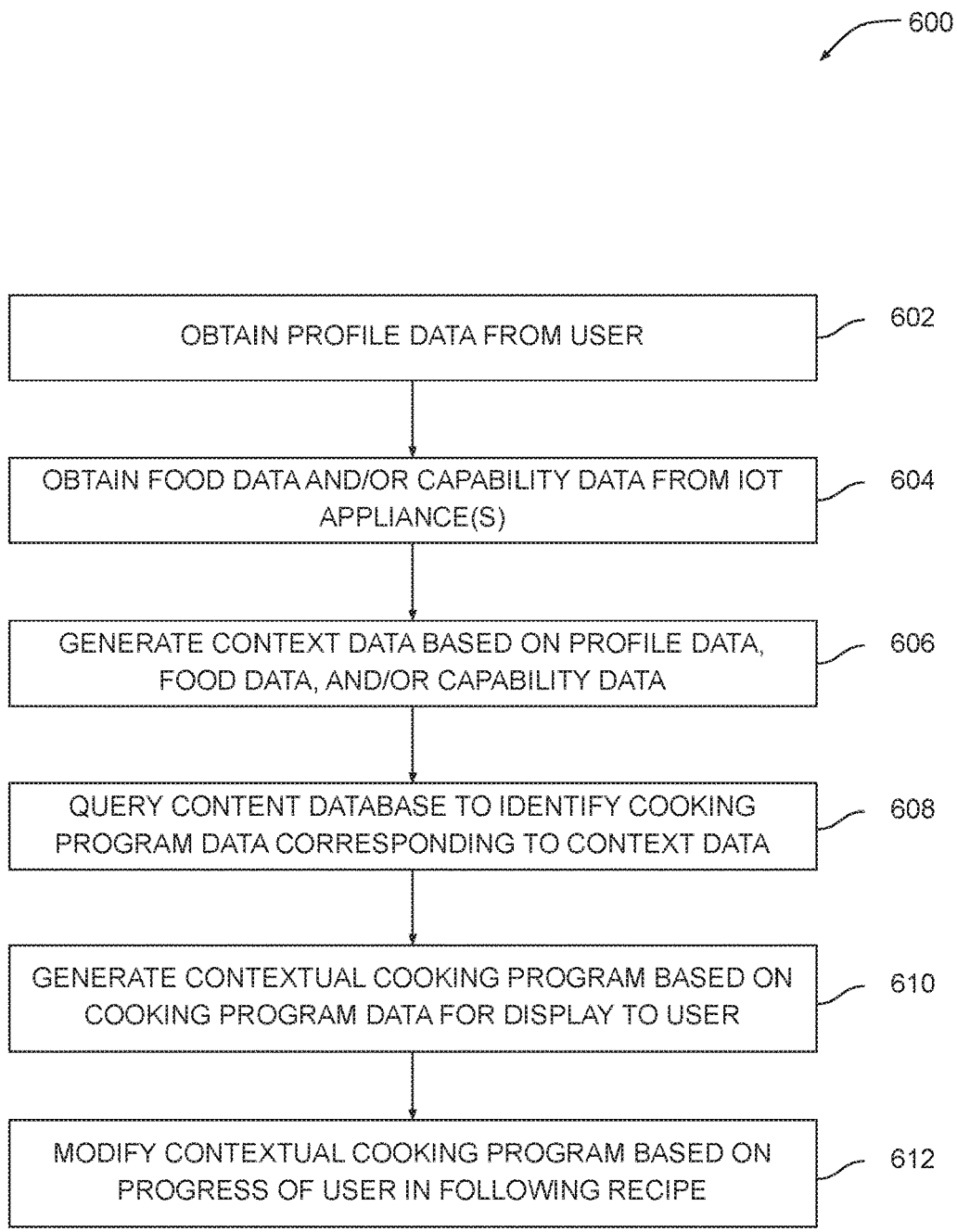
FIG. 6 is a flow diagram of method steps for generating a contextual cooking program, according to various embodiments.

FIG. 6 is a flow diagram of method steps for generating a contextual cooking program, according to various embodiments. Although the method steps are described in conjunction with the systems of FIGS. 1-2 and 5, persons skilled in the art will understand that any system configured to perform the method steps in any order falls within the scope of the present embodiments.

As shown, a method 600 begins at step 602, where context generator 200 within recommendation engine 120 obtains profile data 122 from the user. Profile data 122 indicates various preferences associated with the user, including food item preferences, food preparation preferences, appliance preferences, cooking program preferences, and so forth. Profile data 122 also indicates various constraints associated with the user, including dietary restrictions, food allergies, restrictions on cooking skills, and so forth.

At step 604, context generator 200 obtains food data 142 and/or capability data 144 from IoT appliance(s) 140. For a given IoT appliance 140, food data 142 indicates the types of food items stored in the IoT appliance 140 or the types of food items that can be prepared using the IoT appliance 140. Capability data 144 indicates, for a given IoT appliance 140, the specific food preparation capabilities associated with that IoT appliance 140. Any of the above data may reflect the state a given IoT appliance 140 and/or any food items stored therein.

At step 606, context generator 200 generates context data 124 based on profile data 122, food data 142, and/or capability data 144. In one embodiment, context data 124 may include a set of tags that correspond to characteristics associated with the user and/or one or more IoT appliance(s) 140, a vector of data values, where each data value indicates a score for a different characteristic associated with the user and/or one or more IoT devices 140, and a set of weight values for each data value. Further, context generator 200 may be configured to dynamically modify the vector of data values and/or corresponding weight values over time based on user behavior, including viewing behavior, food consumption, food preparation activities, and so forth.

At step 608, content generator 202 within recommendation engine 120 queries content database 138 to identify cooking program data 210 corresponding to context data 124. In one embodiment, content generator 202 may identify relevant cooking program data 210 based on context data 124 by comparing context data 124 to dependencies 216 included in cooking program data 210 and then extracting different cooking program data 210 based on whether the corresponding dependencies 216 are met.

At step 610, content generator 202 generates contextual cooking program 164 based on cooking program data 210 and outputs contextual cooking program 164 to the user via display device 162. Content generator 202 can perform various techniques for generating contextual cooking program 164, including stitching together one or more media clips included in media content 212, compositing portions of media content 212 with rendered text or graphics derived from recipe 214 and/or dependencies 216, or simply obtaining media content 212 and outputting media content 212 directly to the user.

At step 612, content generator 202 modifies contextual cooking program 164 based on the progress of the user in following recipe 214 set forth in contextual cooking program 164. In particular, content generator 202 can dynamically stall or advance playback of contextual cooking program 164 based on the progress of the user in performing the various steps associated with recipe 214. Content generator 202 can also splice additional interstitial content into contextual cooking program 164 during periods of time when the user is waiting. In one embodiment, content generator 202 monitors the progress of the user using one or more input devices and then determining the real-time state of the user using artificial intelligence, including machine learning, computer vision, and/or neural networks.

In sum, a recommendation engine generates contextually relevant media programs tailored to the specific context of the user. The recommendation engine interfaces with one or more Internet-of-Things (IoT) appliances to gather appliance data that indicates one or more food items stored within the IoT appliance(s) and/or one or more cooking capabilities associated with the IoT appliance(s), among other information. The recommendation engine also gathers profile data that reflects a set of preferences associated with the user. Based on the context data, the recommendation engine queries a database that stores cooking program data associated with various cooking programs. Based on identified cooking program data, the recommendation engine generates a contextual cooking program that includes media content describing how to perform the associated recipe. During playback of the contextual cooking program, the recommendation engine monitors the progress of the user in following the recipe and can modify the contextual cooking program, or playback thereof, in order to maintain synchrony with and/or adapt to the progress of the user.

At least one technical advantage of the disclosed techniques relative to the prior art is that the disclosed techniques enable contextually relevant cooking programs to be automatically generated for users. Accordingly, cooking programs generated using the disclosed techniques may be more engaging to users than cooking programs recommended to users via conventional recommendation engines. Another technical advantage of the disclosed techniques is that the disclosed techniques enable a cooking program to be dynamically adapted to the progress of the user in following a recipe set forth in the cooking program. By adapting the cooking program to each particular user, user engagement is maintained or enhanced throughout the course of the cooking program. These technical advantages represent one or more technological advancements over prior art approaches.

1. Some embodiments include a computer-implemented method for generating a media program, the method comprising determining a first state that is associated with a first appliance or at least one item stored within the first appliance, determining a first portion of media content based on the first state, wherein the first portion of media content includes a first instruction associated with the first state, and generating a first media program based on the first portion of media content, wherein the first media program provides instructions to a user for performing one or more operations associated with the first state.

2. The computer-implemented method of clause 1, further comprising determining that the user has performed a first operation corresponding to the first instruction, and in response, advancing the first media program to a playback position corresponding to a second instruction.

3. The computer-implemented method of any of clauses 1-2, further comprising determining that the user is performing a first operation corresponding to the first instruction, determining a first interval of time corresponding to the first operation and during which the user performs the first operation, pausing playback of the first media program during the first interval of time, and playing at least a portion of interstitial content during the first interval of time.

4. The computer-implemented method of any of clauses 1-3, further comprising determining a first dependency associated with the first instruction based on a source media program that includes the first portion of media content, wherein the first dependency indicates a skill or item that is needed to implement the first instruction, generating a first data record that includes the first portion of media content, the first instruction, and the first dependency, and populating a database with the first data record.

5. The computer-implemented method of any of clauses 1-4, wherein determining the first portion of media content comprises executing a query against the database using the first state to identify the first data record.

6. The computer-implemented method of any of clauses 1-5, wherein the first appliance comprises a food storage appliance, the at least one item comprises at least one food item, and the first appliance stores the at least one food item.

7. The computer-implemented method of any of clauses 1-6, wherein the first state indicates an expiration date associated with the at least one food item.

8. The computer-implemented method of any of clauses 1-7, wherein the first appliance comprises a food preparation appliance, and the first state comprises a food preparation capability associated with the first appliance.

9. The computer-implemented method of any of clauses 1-8, wherein the first state indicates a temperature range associated with the food preparation capability, wherein the first appliance performs food preparation operations associated with the temperature range.

10. The computer-implemented method of any of clauses 1-9, wherein the first appliance comprises a kitchen appliance, and the first media program comprises a cooking program.

11. Some embodiments include a non-transitory computer-readable medium storing program instructions that, when executed by a processor, cause the process to generate a media program by performing the steps of determining a first state that is associated with a first appliance or at least one item stored within the first appliance, determining a first portion of media content based on the first state, wherein the first portion of media content includes a first instruction associated with the first state, and generating a first media program based on the first portion of media content, wherein the first media program provides instructions to a user for performing one or more operations associated with the first state.

12. The non-transitory computer-readable medium of clause 11, further comprising the steps of determining that the user has performed a first operation corresponding to the first instruction, and in response, advancing the first media program to a playback position corresponding to a second instruction.

13. The non-transitory computer-readable medium of any of clauses 11-12, further comprising the steps of determining that the user is performing a first operation corresponding to the first instruction, determining a first interval of time corresponding to the first operation and during which the user performs the first operation, pausing playback of the first media program during the first interval of time, and playing at least a portion of interstitial content during the first interval of time.

14. The non-transitory computer-readable medium of any of clauses 11-13, further comprising the steps of determining a first dependency associated with the first instruction based on a source media program that includes the first portion of media content, wherein the first dependency indicates a skill or item that is needed to implement the first instruction, generating a first data record that includes the first portion of media content, the first instruction, and the first dependency, and populating a database with the first data record.

15. The non-transitory computer-readable medium of any of clauses 11-14, wherein the step of determining the first portion of media content comprises executing a query against the database using the first state to identify the first data record.

16. The non-transitory computer-readable medium of any of clauses 11-15, wherein the first instruction is associated with performing at least one food preparation operation for a recipe being presented to a user via the first media program.

17. The non-transitory computer-readable medium of any of clauses 11-16, further comprising the steps of determining a first dependency associated with the first instruction that indicates a skill or item that is needed to implement the first instruction, performing a first action to provide the user with the skill or item.

18. The non-transitory computer-readable medium of any of clauses 11-17, wherein the step of performing the first action comprises displaying a second portion of media content to the user, wherein the second portion of media content indicates one or more techniques for performing the skill.

19. The non-transitory computer-readable medium of any of clauses 11-18, wherein the step of performing the first action comprises automatically obtaining the item from a third-party for the user.

20. Some embodiments include a system, comprising a memory storing a software application, and a processor that, when executing the software application, is configured to generate a media program by performing the steps of determining a first state that is associated with a first appliance or at least one item stored within the first appliance, determining a first portion of media content based on the first state, wherein the first portion of media content includes a first instruction associated with the first state, and generating a first media program based on the first portion of media content, wherein the first media program provides instructions to a user for performing one or more operations associated with the first state.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a media program, the method comprising:
    determining a first state that is associated with a procedure to be performed by a user, wherein the first state comprises a capability of a first appliance or an availability of at least one item stored within the first appliance;
    determining a set of instructions for performing the procedure based on a comparison of (i) a set of weighted data values and (ii) a set of dependencies for the procedure, wherein the set of weighted data values is generated based on a set of data values that quantify one or more characteristics included in the first state and a set of weights indicating relative importances of the one or more characteristics;
    determining a first portion of media content that depicts a first instruction included in the set of instructions; and
    generating a first media program based on the first portion of media content, wherein the first media program provides the first instruction to the user.

2. The computer-implemented method of claim 1, further comprising:
    determining that the user has performed a first operation corresponding to the first instruction; and
    in response, advancing the first media program to a playback position corresponding to a second instruction included in the set of instructions.

3. The computer-implemented method of claim 1, further comprising:
    determining that the user is performing a first operation corresponding to the first instruction;
    determining a first interval of time during which the user performs the first operation;
    pausing playback of the first media program during the first interval of time; and
    playing at least a portion of interstitial content during the first interval of time.

4. The computer-implemented method of claim 1, further comprising:
    determining a first dependency that is included in the set of dependencies and associated with the first instruction based on a source media program that includes the first portion of media content, wherein the first dependency indicates a skill or item that is needed to implement the first instruction;
    generating a first data record that includes the first portion of media content, the first instruction, and the first dependency; and
    populating a database with the first data record.

5. The computer-implemented method of claim 4, wherein determining the set of instructions comprises executing a query against the database using the first state to identify the first data record.

6. The computer-implemented method of claim 1, wherein the first appliance comprises a food storage appliance, the at least one item comprises at least one food item, and the first appliance stores the at least one food item.

7. The computer-implemented method of claim 6, wherein the first state indicates an expiration date associated with the at least one food item.

8. The computer-implemented method of claim 1, wherein the first appliance comprises a food preparation appliance, and the first state comprises a food preparation capability associated with the first appliance.

9. The computer-implemented method of claim 8, wherein the first state indicates a temperature range associated with the food preparation capability, wherein the first appliance performs food preparation operations associated with the temperature range.

10. The computer-implemented method of claim 1, wherein the first appliance comprises a kitchen appliance, and the first media program comprises a cooking program.

11. A non-transitory computer-readable medium storing program instructions that, when executed by a processor, cause the processor to generate a media program by performing the steps of:
    determining a first state that is associated with a procedure to be performed by a user, wherein the first state comprises a capability of a first appliance or an availability of at least one item stored within the first appliance;
    determining a set of instructions for performing the procedure based on a comparison of (i) a set of weighted data values and (ii) a set of dependencies for the procedure, wherein the set of weighted data values is generated based on a set of data values that quantify one or more characteristics included in the first state and a set of weights indicating relative importances of the one or more characteristics;
    determining a first portion of media content that depicts a first instruction included in the set of instructions; and
    generating a first media program based on the first portion of media content, wherein the first media program provides the first instruction to the user.

12. The non-transitory computer-readable medium of claim 11, wherein the program instructions further cause the processor to perform the steps of:
    determining that the user has performed a first operation corresponding to the first instruction; and
    in response, advancing the first media program to a playback position corresponding to a second instruction included in the set of instructions.

13. The non-transitory computer-readable medium of claim 11, wherein the program instructions further cause the processor to perform the steps of:
    determining that the user is performing a first operation corresponding to the first instruction;
    determining a first interval of time during which the user performs the first operation;
    pausing playback of the first media program during the first interval of time; and
    playing at least a portion of interstitial content during the first interval of time.

14. The non-transitory computer-readable medium of claim 11, wherein the program instructions further cause the processor to perform the steps of:
    determining a first dependency that is included in the set of dependencies and associated with the first instruction based on a source media program that includes the first portion of media content, wherein the first dependency indicates a skill or item that is needed to implement the first instruction;
    generating a first data record that includes the first portion of media content, the first instruction, and the first dependency; and
    populating a database with the first data record.

15. The non-transitory computer-readable medium of claim 14, wherein the step of determining the set of instructions comprises executing a query against the database using the first state to identify the first data record.

16. The non-transitory computer-readable medium of claim 11, wherein the first instruction is associated with performing at least one food preparation operation for a recipe being presented to a user via the first media program.

17. The non-transitory computer-readable medium of claim 11, wherein the program instructions further cause the processor to perform the steps of:
determining a first dependency associated with the first instruction that indicates a skill or item that is needed to implement the first instruction; and
performing a first action to provide the user with the skill or item.

18. The non-transitory computer-readable medium of claim 17, wherein the step of performing the first action comprises displaying a second portion of media content to the user, wherein the second portion of media content indicates one or more techniques for performing the skill.

19. The non-transitory computer-readable medium of claim 17, wherein the step of performing the first action comprises automatically ordering the item for delivery to the user.

20. A system, comprising:
a memory storing a software application; and
a processor that, when executing the software application, is configured to generate a media program by performing the steps of:
determining a first state that is associated with a procedure to be performed by a user, wherein the first state comprises a capability of a first appliance or an availability of at least one item stored within the first appliance;
determining a set of instructions for performing the procedure based on a comparison of (i) a set of weighted data values and (ii) a set of dependencies for the procedure, wherein the set of weighted data values is generated based on a set of data values that quantify one or more characteristics included in the first state and a set of weights indicating relative importances of the one or more characteristics;
determining a first portion of media content that depicts a first instruction included in the set of instructions; and
generating a first media program based on the first portion of media content, wherein the first media program provides the first instruction to the user.

* * * * *